(12) United States Patent
Aoki (10) Patent No.: US 7,038,726 B2
(45) Date of Patent: May 2, 2006

(54) ELECTRONIC CAMERA

(75) Inventor: Hitoshi Aoki, Setagaya-ku (JP)

(73) Assignee: Nikon Corporation, Tokyo (JP)

( * ) Notice: Subject to any disclaimer, the term of this patent is extended or adjusted under 35 U.S.C. 154(b) by 323 days.

(21) Appl. No.: 10/421,879

(22) Filed: Apr. 24, 2003

(65) Prior Publication Data

US 2003/0193587 A1 Oct. 16, 2003

Related U.S. Application Data

(63) Continuation of application No. 09/247,533, filed on Feb. 10, 1999, now abandoned.

(30) Foreign Application Priority Data

Mar. 13, 1998 (JP) .................................. 10-63348

(51) Int. Cl.
*H04N 5/225* (2006.01)
*G03B 17/02* (2006.01)

(52) U.S. Cl. ...................................... 348/373; 396/535

(58) Field of Classification Search ................. 348/373
See application file for complete search history.

(56) References Cited

U.S. PATENT DOCUMENTS

| 5,442,453 | A | * | 8/1995 | Takagi et al. ............... 348/376 |
| 5,697,005 | A | * | 12/1997 | Kikuchi ...................... 396/535 |
| 5,708,897 | A | | 1/1998 | Manabe et al. |
| 5,739,859 | A | | 4/1998 | Hattori et al. |
| 6,141,505 | A | * | 10/2000 | Miyata et al. .............. 348/376 |
| 6,249,653 | B1 | * | 6/2001 | Itoh et al. ................... 348/373 |
| 6,295,008 | B1 | | 9/2001 | Kondo et al. |

* cited by examiner

*Primary Examiner*—Tuan Ho
*Assistant Examiner*—Nhan Tran
(74) *Attorney, Agent, or Firm*—Oliff & Berridge, PLC (57) ABSTRACT

An electronic camera includes: a body unit entirely covered by a resin cover member; a supporting member provided inside the cover member; a unit linking member for linking with another unit, one end of which is inserted inside the cover member through an opening formed at the cover member, the one end being supported by the supporting member inside the cover member; a metal reinforcement member provided along an outside portion of the cover member; and a retaining member that secures together the supporting member provided inside the cover member and the reinforcement member provided along an outside portion of the cover member with the cover member clamped between the supporting member and the reinforcement member.

6 Claims, 8 Drawing Sheets

ELECTRONIC CAMERA

INCORPORATION BY REFERENCE

The disclosure of the following priority application is herein incorporated by reference:

Japanese Patent Application No. 10-63348 filed Mar. 13, 1998

BACKGROUND OF THE INVENTION

1. Field of the Invention

The present invention relates to an electronic camera such as a video camera or a digital still camera.

2. Description of the Related Art

In recent years, electronic cameras achieved by rotatably linking an image capture unit main body that generates an image by capturing the optical image of a subject and a display unit main body that displays the image thus generated have been developed. Under normal circumstances, a photographing lens and an image capture element are provided at the image capture unit main body of such an electronic camera. In addition, the display unit main body is provided with a liquid crystal display (LCD)

By using this electronic camera, the operator can capture an image of the subject with the photographing lens provided at the image capture unit main body in any direction freely, e.g., upward or downward as well as forward, while monitoring the image on the display screen of the LCD provided at the display unit main body. In addition, the image can be reproduced right on the spot where the image has been captured for verification.

Now, in order to rotatably link the two separate body units (image capture unit main body and the display unit main body) as in the electronic camera described above, one end of a linking mechanism is secured to the cover of one of the body units with the other end rotatably mounted at the cover of the other body unit.

However, if the cover is constituted of resin (plastic), concentration of stress occurs around the screws that are used to secure the linking mechanism directly to the cover of the body unit.

Consequently, in order to reinforce the mounting of the linking mechanism at the resin cover, the thickness of the resin cover in the area where the screws are secured must be increased. An increase in the thickness of the cover presents an obstacle in achieving a more compact electronic camera.

If, on the other hand, the body unit cover is constituted of metal, which will achieve greater strength compared to the resin cover, the linking mechanism can be firmly secured even to a thin cover, which will prove advantageous in regard to the miniaturization of the electronic camera. However, since metal covers are expensive, the use of them will be disadvantageous with respect to the production cost.

SUMMARY OF THE INVENTION

An object of the present invention is to provide an electronic camera having a linking mechanism firmly mounted at the cover of the body unit, which is constituted of resin, without having to increase the thickness of the resin cover.

In order to attain the above object, an electronic camera according to the present invention comprises: a body unit entirely covered by a resin cover member; a supporting member provided inside the cover member; a unit linking member for linking with another unit, one end of which is inserted inside the cover member through an opening formed at the cover member, the one end being supported by the supporting member inside the cover member; a metal reinforcement member provided along an outside portion of the cover member; and a retaining member that secures together the supporting member provided inside the cover member and the reinforcement member provided along an outside portion of the cover member with the cover member clamped between the supporting member and the reinforcement member.

In the above electronic camera, preferably, the cover member is formed in a roughly rectangular parallelepiped shape; and the reinforcement member includes a first reinforcement member extending from a linking surface of the cover member provided with the opening to a first side surface perpendicular to the linking surface along an outside portion of the cover member and a second reinforcement member extending from the linking surface to a second side surface facing opposite the first side surface along an outside portion of the cover member.

Further, preferably, the retaining member includes a plurality of screws; the supporting member includes a metal plate at which female threaded holes for the plurality of screws are formed; the cover member has a first cover member that includes most of the linking surface and the first side surface, and a second cover member that includes the second side surface; through holes for the plurality of screws at the cover member are all formed at a part of the linking surface which belongs to the first cover member; and through holes for the plurality of screws at the reinforcement member are formed both at the first reinforcement member and the second reinforcement member that come in contact with the linking surface.

Furthermore, preferably, the plurality of screws are each provided with projections on a side that comes in contact with the reinforcement member at a head of the screw.

Another electronic camera comprises: a first body unit entirely covered by a resin cover member; a second body unit entirely covered by a resin cover member; a unit linking member used for linking the first body unit and the second body unit; a first supporting member provided inside the cover member of the first body unit; a second supporting member provided inside the cover member of the second body unit; a metal first reinforcement member provided outside the cover member of the first body unit; a metal second reinforcement member provided outside the cover member of the second body unit; a first retaining member that secures together the first supporting member provided inside the cover member of the first body unit and the first reinforcement member provided outside the cover member of the first body unit, with the cover member of the first body unit clamped between the first supporting member and the first reinforcement member; and a second retaining member that secures together the first supporting member provided inside the cover member of the second body unit and the second reinforcement member provided outside the cover member of the second body unit, with the cover member of the second body unit clamped between the second supporting member and the second reinforcement member. And: one end of the unit linking member is inserted inside the cover member of the first body unit through an opening formed at the cover member of the first body unit to be supported by the first supporting member inside the cover member of the first body unit; another end of the unit linking member is inserted inside the cover member of the second body unit through an opening formed at the cover member of the second body unit to be supported by the second supporting member inside the cover member of the second body unit; and at least either end of the unit linking member is supported rotatably.

In this electronic camera, preferably, the first body unit includes an image capture device for capturing an image of a subject; and the second body unit includes a display device for displaying an image captured by the image capture device.

DESCRIPTION OF THE PREFERRED EMBODIMENTS

The following is a detailed explanation of the preferred embodiments of the present invention in reference to the drawings.

Figure 1:
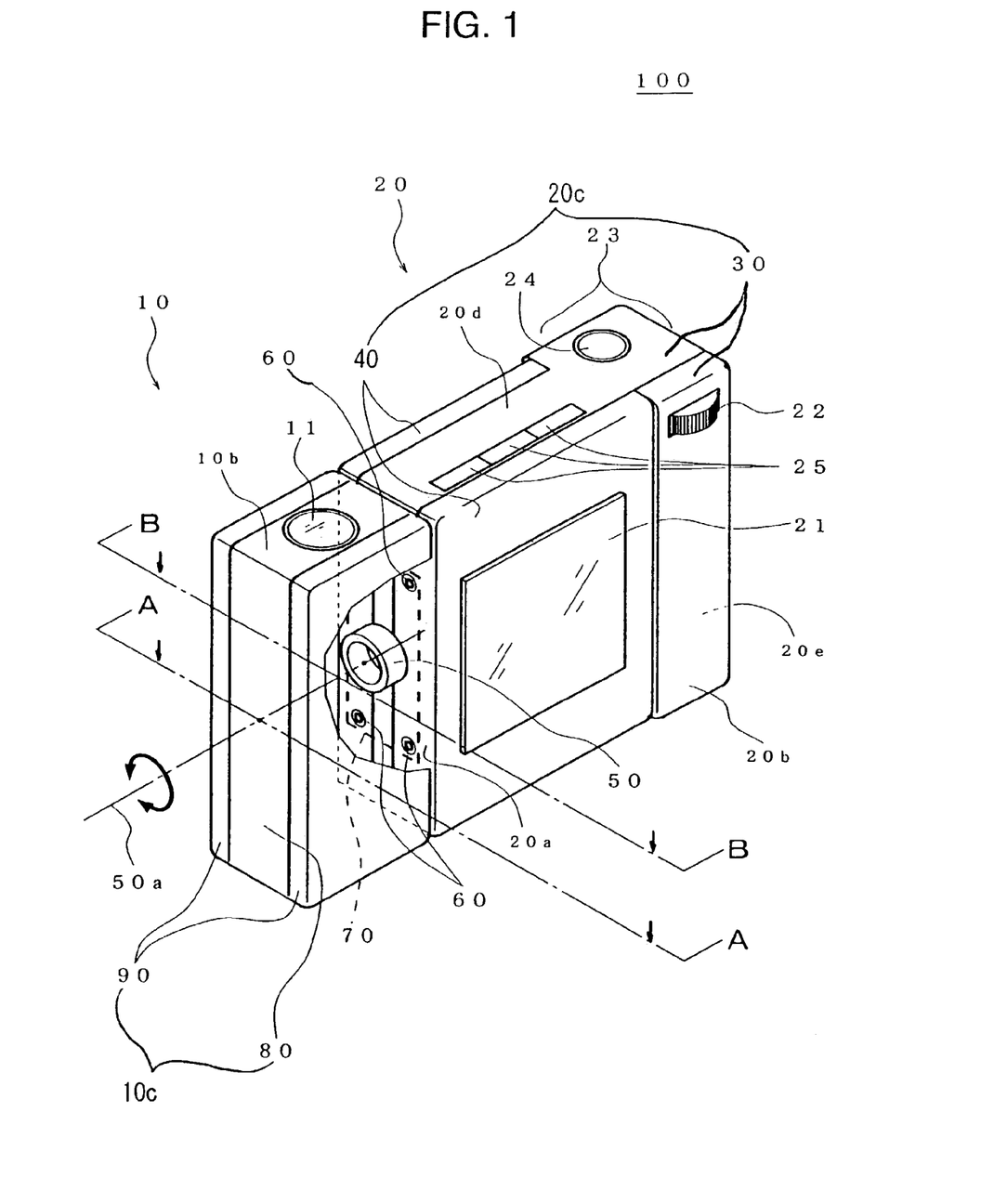
FIG. 1 is an external view of the rear of an electronic camera 100 viewed diagonally from above.

FIG. 1 is an external view of the rear of an electronic camera 100 viewed diagonally from above. The electronic camera 100 is constituted of an image capture unit main body 10 and a display unit main body 20 (or body units).

At the image capture unit main body 10, a photographing lens unit and an image capture element (not shown) are provided inside, with an opening portion 11 for the photographing lens provided at an upper surface 10b of a cover 10c. At the image capture unit main body 10, an image of the subject is formed on the image capture element by the photographing lens unit and the image of the subject is captured and the image is generated by the image capture element.

The cover 10c of the image capture unit main body 10 comprises a resin cover 80 formed in a roughly rectangular parallelepiped shape, which covers the entire image capturing unit main body 10 and a metal cover 90 constituted of an aluminum alloy, which partially covers the image capture unit main body 10 from the outside of the resin cover 80.

At the display unit main body 20, an LCD (not shown) is provided inside, with a display window 21 for the LCD provided at a rear surface 20b of a cover 20c. At the display unit main body 20, images generated at the image capture unit main body 10 are displayed, photographed images are reproduced, the setting menu for the electronic camera 100 is displayed and a list of functions of the electronic camera 100 is displayed on the LCD.

In addition, at the display unit main body 20, a zoom button 22 is provided at the rear surface 20b of the cover 20c, a release button 24 and function buttons 25 are provided at an upper surface 20d of the cover and a grip portion 23 is provided in the vicinity of an end surface 20e of the cover 20c.

The zoom button 22 adjusts the lens position for the photographing lens unit inside the image capture unit main body 10 to enlarge or reduce the size of the image of the subject. The function buttons 25 are a group of buttons for setting or canceling a photographing mode of the electronic camera 100.

Inside the display unit main body 20, a battery chamber for storing batteries, a circuit board engaged in image processing, a loading chamber for a memory card which can be mounted or dismounted freely (none shown) are provided as well. The cover 20c of the display unit main body 20 is constituted of a resin cover (or a cover member) 30 formed in a roughly rectangular parallelepiped shape, which covers the entire display unit main body 20 and a metal cover (or a reinforcement member) 40 constituted of an aluminum alloy which partially covers the display unit main body 20 from the outside of the resin cover 30.

At a linking surface 20a of the cover 20c of the display unit main body 20 structured as described above, which is linked to the image capture unit main body 10, a hollow linking shaft (or a unit linking member) 50 is secured, as shown in a cutaway area of the image capture unit main body 10 in FIG. 1.

When securing the linking shaft 50 to the cover 20c of the display unit main body 20, a plurality of screws (or retaining members) 60 and a metal plate (or a supporting member) 70 provided on the inside of the cover 20c of the display unit main body 20 are employed. Details on these members are to be given later.

The linking shaft 50, which is secured to the cover 20c of the display unit main body 20, is mounted to the cover 10c of the image capture unit main body 10 in such a manner that the linking shaft 50 can rotate (0°~270°) around the central axis 50a of the linking shaft 50. The details of this structure are to be given layer. Rotation, as referred to in this context, includes rotation in both forward and reverse directions.

Figure 2:
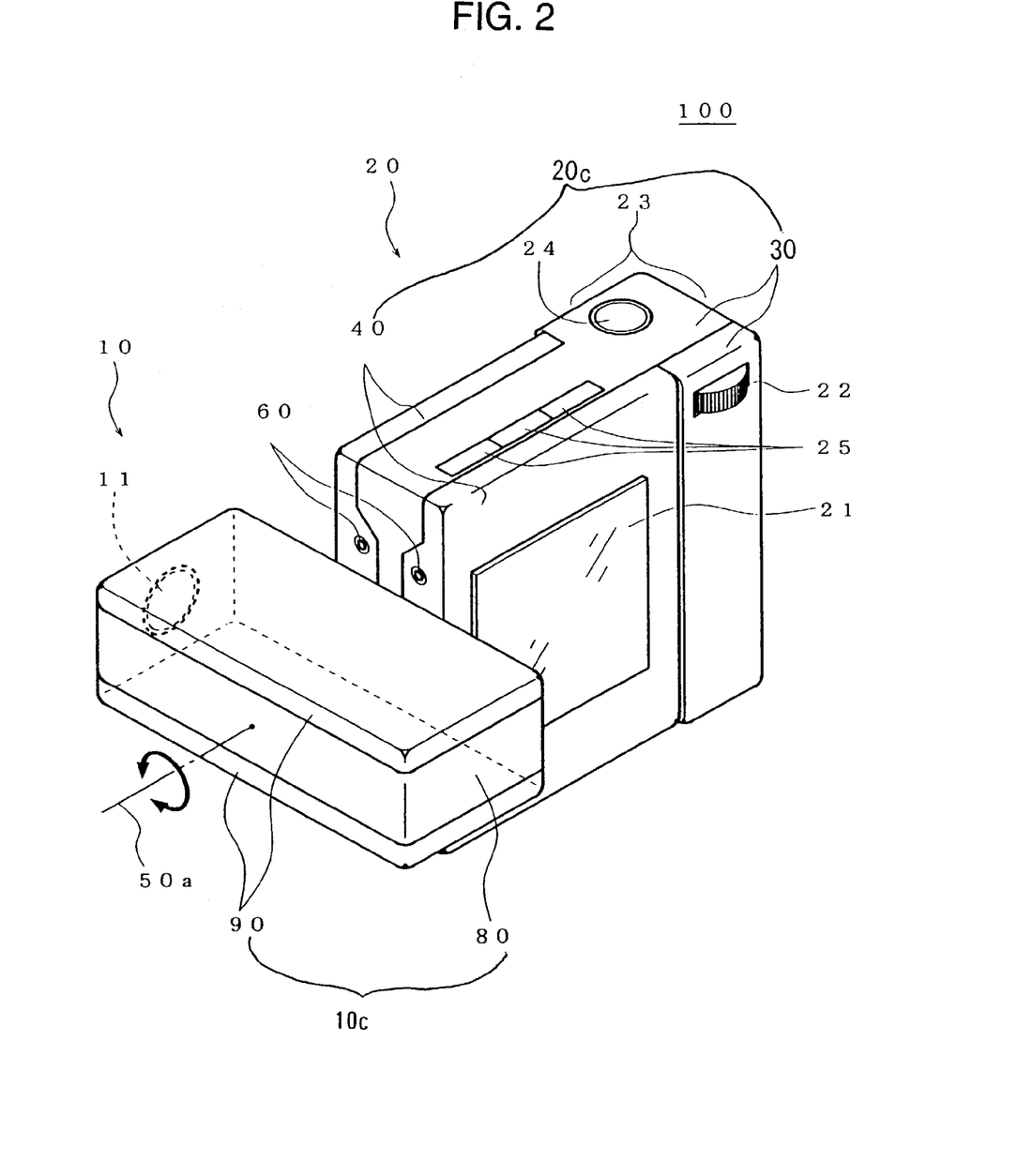
FIG. 2 is an external view of the electronic camera 100 in a photographing state.

As illustrated in FIG. 2, at the electronic camera 100 structured as described above, the image capture unit main body 10 and the display unit main body 20 are caused to rotate by a specific angle during photographing so that the opening portion 11 for the photographing lens provided at the image capture unit main body 10 is positioned toward the subject. Regardless of the direction of the subject, the image capture unit main body 10 can be made to rotate relative to the display unit main body 20 so that the opening portion 11 for the photographing lens can be positioned toward the subject for photographing.

The wiring for electrically connecting the components inside the image capture unit main body 10 and the components inside the display unit main body 20 is inserted in the hollow portion of the linking shaft 50 (see FIG. 1).

Next, a detailed explanation is given on the structure of the cover 20c of the display unit main body 20. An opening 33 for the linking shaft 50 and through holes 34~37 for the screws 60 are formed at one surface, i.e., the linking surface 30a of the resin cover 30 which is part of the cover 20c of the display unit main body 20, as illustrated in the external view (FIG. 3) showing only the resin cover 30 with the metal cover 40 removed. In this structure, the thickness of the resin cover 30 of the display unit main body is within the range of 1.0 mm~1.2 mm.

Figure 3:
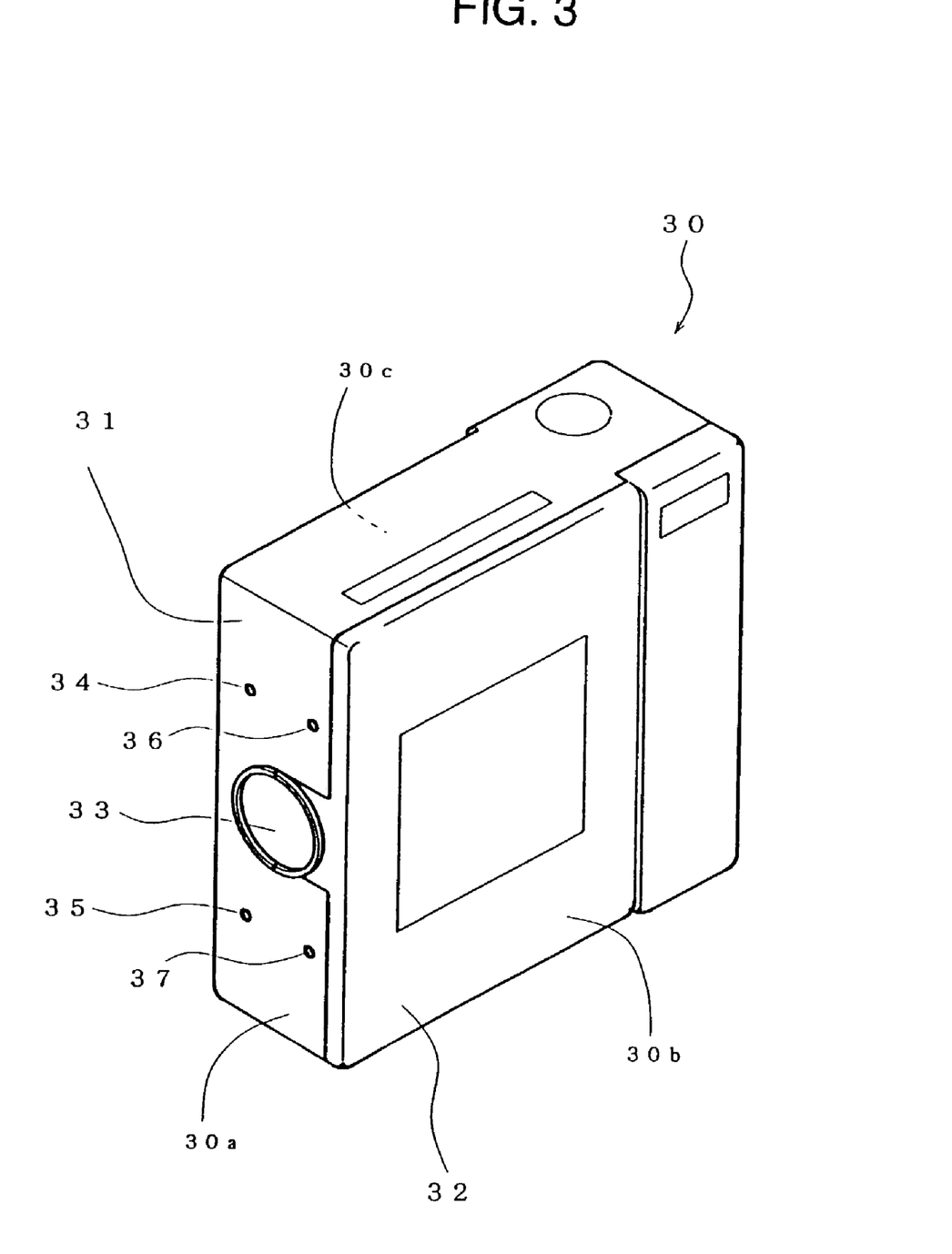
FIG. 3 is an external view of a resin cover 30 of a display unit main body 20.

As illustrated in FIG. 3, the resin cover 30 is divided into two portions, i.e., a resin front cover (or a first cover member) 31 and a resin rear cover (or a second cover member) 32.

Of these, the resin front cover 31 includes most of the linking surface 30a and a front surface (or a first side surface) 30c perpendicular to the linking surface 30a. The through holes 34~37 mentioned earlier are all formed at the resin front cover 31.

The resin rear cover 32 is mainly constituted of a rear surface (or a second side surface) 30b which faces opposite the front surface 30c. Slits (not shown) are formed at the resin front cover 31 and the resin rear cover 32 for mounting the metal cover 40.

Figure 4:
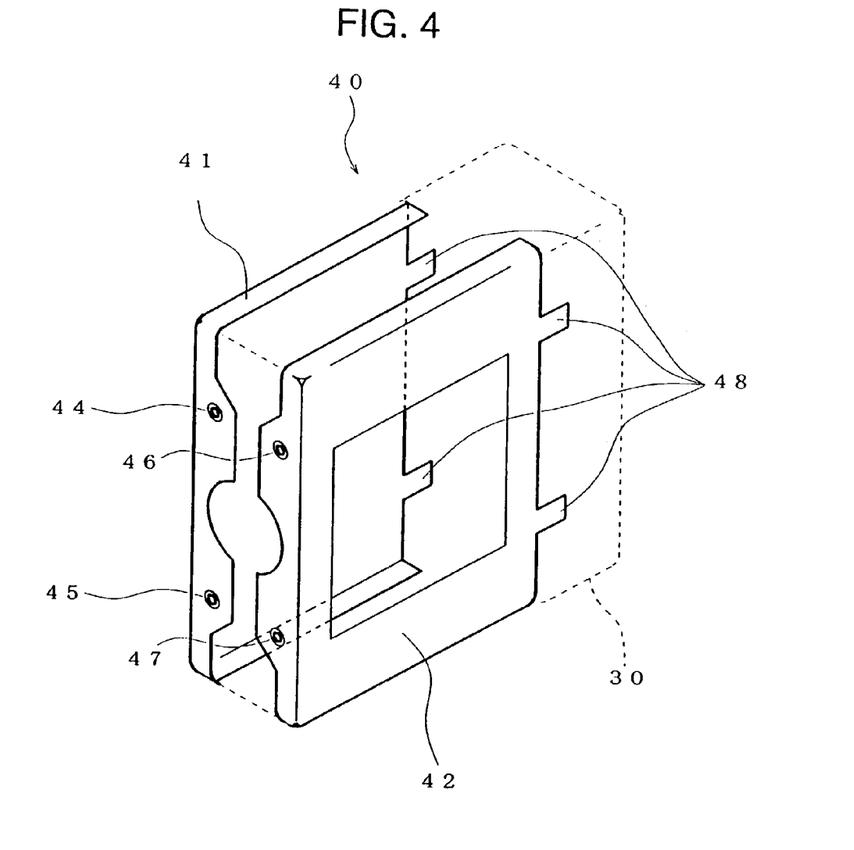
FIG. 4 is an external view of a metal cover 40 provided on the outside of the resin cover 30.

The metal cover 40, which is provided on the outside of the resin cover 30 structured as described above (see FIG. 3) comprises a metal front cover (or a first reinforcement member) 41 and a metal rear cover (or a second reinforcement member) 42 as illustrated in FIG. 4. The thicknesses of the metal front cover 41 and the metal rear cover 42 in this structure are both within the range of 0.6 mm~0.8 mm.

Of these, the metal front cover 41 achieves a shape that conforms to the outside of the linking surface 30a and the front surface 30c of the resin cover 30 (see FIG. 3). Through holes 44 and 45 for the screws 60 are formed at the metal front cover 41 at positions that come into contact with the linking surface 30a.

The metal rear cover 42 achieves a shape that conforms to the outside of the linking surface 30a and the rear surface 30b of the resin cover 30 (see FIG. 3). Through holes 46 and 47 for the screws 60 are formed at the metal rear cover 42 at positions that come into contact with the linking surface 30a.

Projections 48 that fit in the slits (not shown) at the resin cover 30 are formed at the metal front cover 41 and the metal rear cover 42. Consequently, when the metal front cover 41 (see FIG. 4) described above is placed to cover the outside of the resin cover 30, the pair of projections 48 of the metal front cover 41 fit into the slits at the resin cover 30, and at the same time, the through holes 45 and 46 of the metal front cover 41 are aligned with the through holes 34 and 35 of the resin front cover 31. At this point, the metal front cover 41 extends from the linking surface 30a to the front surface 30c of the resin cover 30 along the outside of the resin cover 30.

When the metal rear cover 42 (see FIG. 4) described above is placed to cover the outside of the resin cover 30 (see FIG. 3), the pair of projections 48 at the metal rear cover 42 are made to fit into the slits at the resin cover 30, and at the same time, the through holes 46 and 47 of the metal rear cover 42 are aligned with the through holes 36 and 37 at the resin front cover 31. At this point, the metal rear cover 42 extends from the linking surface 30a to the rear surface 30b of the resin cover 30 along the outside of the resin cover 30.

As a result, the cover 20c of the display unit main body 20 assumes a double structure constituted of the resin cover 30 and the metal cover 40 except for at the grip portion 23 and in its vicinity where the resin cover 30 is exposed to the outside, as illustrated in FIG. 1.

Figure 5:
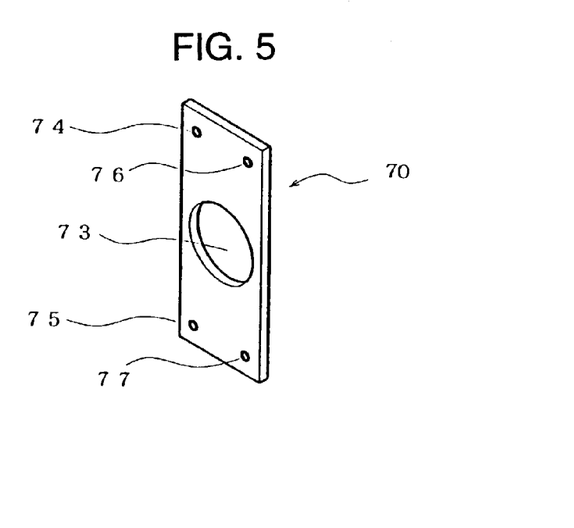
FIG. 5 it is an external view of a metal plate 70 provided on the inside of the resin cover 30.

When securing the linking shaft 50 to the cover 20c of the display unit main body 20 described above, the metal plate 70, which is provided on the inside of the cover of the display unit main body 20, is employed in addition to the four screws 60. As illustrated in FIG. 5, an opening 73 for the linking shaft 50 and female threaded holes 74~77 for the screws 60 are formed at the metal plate 70. The positions at which the opening 70 and the female threaded holes 74~77 are formed correspond to the positions of the opening 33 and the through holes 34~37 at the resin cover 30 (see FIG. 3).

Next, the manner in which the linking shaft 50 is secured to the cover of the display unit main body 20 using the metal plate 70 and the four screws 60 mentioned above is explained in reference to FIGS. 6 and 7.

Figure 6:
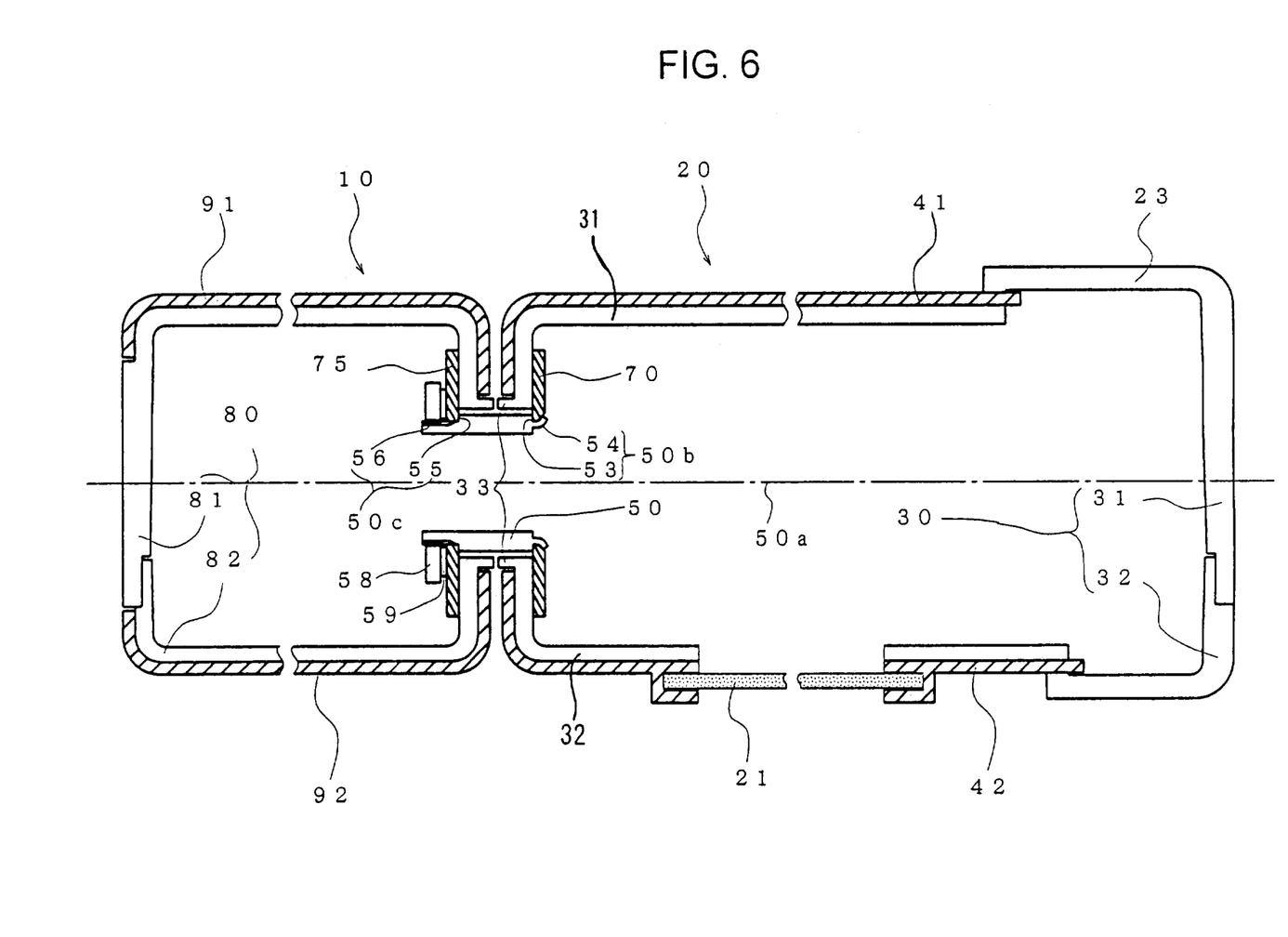
FIG. 6 is a cross section of the electronic camera 100 viewed in the direction indicated by the arrows over line A—A in FIG. 1.
Figure 7:
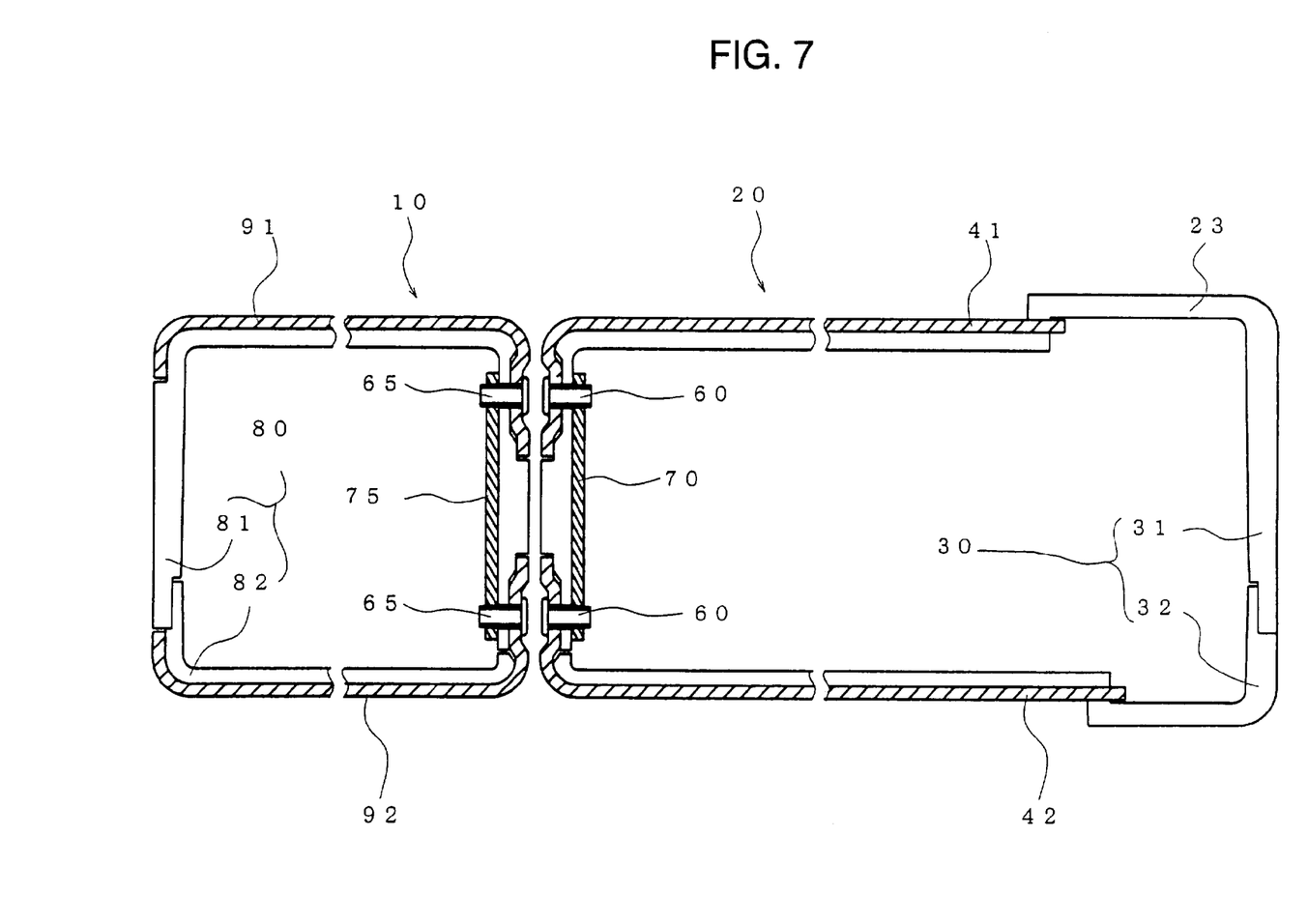
FIG. 7 is a cross section of the electronic camera 100 viewed in the direction indicated by the arrows over line B—B in FIG. 1.

FIG. 6 is a cross section through line A—A intersecting the central axis 50a, viewed in the direction indicated by the arrows in FIG. 1. FIG. 7 is a cross section through line B—B intersecting the screws 60 in the perpendicular direction viewed in the direction indicated by the arrows in FIG. 1. It is to be noted that any illustration of the internal structure of the electronic camera 100 is omitted in FIGS. 6 and 7.

Figure 8:
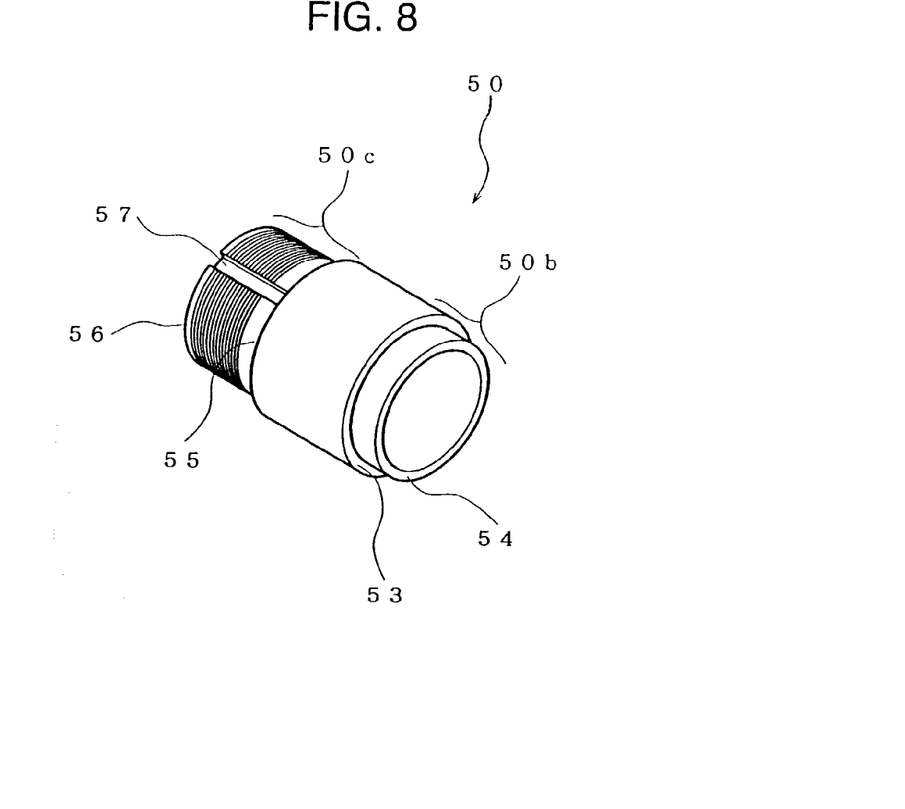
FIG. 8 is an external view of the linking shaft 50.

As illustrated in FIG. 8, a staged portion 53 and a thinned portion 54 are provided at one end 50b of the linking shaft 50 which is secured to the cover 20c of the display unit main body 20.

As illustrated in FIG. 6, the one end 50b of the linking shaft 50 inserted through the opening 33 of the resin cover 30 to the inside comes in contact with the opening 73 of the metal plate 70 at its staged portion 53. Then, by caulking (or bending outside) the thinned portion 54 provided at the one end 50b of the linking shaft 50, the one end 50b of the linking shaft 50 and the metal plate 70 are secured together.

The metal plate 70, at which the one end 50b of the linking shaft 50 is secured, is secured to the cover 20c (the resin cover 30 and the metal cover 40) of the display unit main body 20 with the plurality of screws 60, as illustrated in FIG. 7. In other words, by tightening the screws 60, the metal plate 70, the resin cover 30 and the metal cover 40 (the metal front cover 41 and the metal rear cover 42) are secured tightly as a unit.

Through this process, the one end 50b of the linking shaft 50 is secured to the cover 20c (the resin cover 30 and the metal cover 40) of the display unit main body 20.

Next, a detailed explanation is given on the structure of the cover 10c of the image capture unit main body 10 and also on the method in which the linking shaft 50 (see FIG. 6) secured to the cover 20c of the display unit main body 20 through the process described above is mounted to the cover of the image capture unit main body 10.

When mounting the linking shaft 50 to the cover 10c of the image capture unit main body 10, a plurality of screws 65 and a metal plate 75 provided on the inside of the cover 10c of the image capture unit main body 10 are employed, as illustrated in FIGS. 6 and 7.

An opening for the linking shaft 50 and female threaded holes for the screws 65 are formed at the metal plate 75 as at the metal plate 70 explained earlier. An opening for the linking shaft 50 and through holes for the screws 65 are formed at one surface of the resin cover 80 of the image capture unit main body 10 as at the resin cover 30 described earlier.

As in the case of the resin cover 30, the resin cover 80 is divided into two portions, i.e., a resin front cover 81 and a resin rear cover 82, with the through holes mentioned above all formed at the resin front cover 81. The metal cover 90 which is provided on the outside of the resin cover 80 is constituted of a metal front cover 91 and a metal rear cover 92, as with the metal cover 40 explained earlier.

At the metal front cover 91 and the metal rear cover 92, which both achieve a shape conforming to the outside of the resin cover 80, similar through holes are formed at positions corresponding to the through holes at the resin cover 80. At another end 50*c* of the linking shaft 50 which is mounted to the cover 10*c* (the resin cover 80 and the metal cover 90) of the image capture unit main body 10, a staged portion 55, a male screw thread 56 and a groove 57 are formed as illustrated in FIG. 8.

As illustrated in FIG. 6, the other end 50*c* of the linking shaft 50, which is inserted through the opening of the resin cover 80 to the inside, comes in contact with the opening of the metal plate 75 at its staged portion 55. By fitting a projection (not shown) of a wave washer 59 in the groove 57 provided at the other end 50*c* of the linking shaft 50 and interlocking with the nut 58 over the male screw thread 56, the metal plate 75 is clamped between the nut 58 and wave washer 59 and the staged portion 55.

The metal plate 75 wedged or clamped at the other end 50*c* of the linking shaft 50 is secured to the cover 10*c* (the resin cover 80 and the metal cover 90) of the image capture unit main body 10 with the plurality of screws 65, as illustrated in FIG. 7. Thus, the other end 50*c* of the linking shaft 50 is mounted to the cover 10*c* of the image capture unit main body 10 in such a manner that the linking shaft 50 can rotate freely around its central axis 50*a* while clamping the metal plate 75.

Since the projection (not shown) of the wave washer 59 is fitted in the groove 57, the wave washer cannot rotate relative to the linking shaft 50. As a result, the nut 58 does not rotate and therefore, does not become loosened even when the metal plate 75 rotates together with the cover 10*c* (the resin cover 80 and the metal cover 90) of the image capture unit main body 10. In addition, the spring force imparted by the wave washer 59 prevents any rattling or jolting from occurring during the rotation and also renders a specific level of frictional force.

Consequently, even during rotation, the distance between the metal plate 75 at the image capture unit main body 10 and the metal plate 70 at the display unit main body 30 is maintained at a specific distance which is determined by the staged portions 53 and 55 formed at the linking shaft 50.

As has been explained, in the electronic camera 100 in the embodiment, the metal cover 40 is provided on the outside of the resin cover 30 at the display unit main body 20 and the resin cover 30 is clamped and secured by the screws with the metal cover 40 and the metal plate 70 supporting the one end 50*b* of the linking shaft 50. As a result, the force imparted by the plurality of screws 60 is dispersed over the individual surfaces of the metal cover 40 and the metal plate 70 and the dispersed force is transferred or communicated to the resin cover 30. Consequently, even when the thickness of the resin cover 30 is set small (e.g., 1.0 mm~1.2 mm), the one end 50*b* of the linking shaft 50 can be firmly secured to the resin cover 30. In addition, since the resin cover 30 can be made thinner, miniaturization of the electronic camera becomes possible.

In addition, the metal cover 40 of the display unit main body 20, which extends to the front surface and the rear surface of the display unit main body 20 as well as to the linking surface 20*a* at which the linking shaft 50 is secured, functions as an exterior panel as well as a reinforcement plate for mounting the linking shaft 50 to the cover of the display unit main body 20.

Furthermore, assembly can be achieved with ease without having to provide a special structure for securing the resin front cover 31 and the resin rear cover 32, simply by clamping the resin front cover 31 with the metal front cover 41 and the metal plate 70 and securing the resin front cover 31 through screwing and by clamping the resin front cover 31 and the resin rear cover 32 with the metal rear cover 42 and the metal plate 70 and securing them through screwing.

Moreover, since the entirety of the display unit main body 20 is covered by the resin cover 30, a reduction in the cost is achieved. In addition, the influence of static electricity on the circuit board provided within the display unit main body 20 can be reduced.

Likewise, at the image capture unit main body 10, too, since the metal cover 90 is provided on the outside of the resin cover 80 and the resin cover 80 is clamped with the metal cover 90 and the metal plate 75 which supports the other end 50*c* of the linking shaft 50 to secure the resin cover 80 with the screws, the force imparted by the plurality of screws 65 is dispersed and communicated through the individual surfaces of the metal cover 90 and the metal plate 75 to the resin cover 80. As a result, even if the thickness of the resin cover 80 is reduced (e.g., 1.0 ml~1.2 mm), the other end 50*c* of the linking shaft 50 can be mounted to the resin cover 80 to form a firm link.

In addition, the metal cover 90 of the image capture unit main body 10 which, too, extends to the front surface and the rear surface of the image capture unit main body 10 as well as to the surface at which the linking shaft 50 is secured, functions as a exterior panel as well as a reinforcement plate for mounting the linking shaft 50 to the cover of the image capture unit main body 10.

Furthermore, assembly can be achieved with ease without having to provide a special structure for securing the resin front cover 81 and the resin rear cover 82, simply by clamping the resin front cover 81 with the metal front cover 91 and the metal plate 75 and securing the resin front cover 81 through screwing and by clamping the resin front cover 81 and the resin rear cover 82 with the metal rear cover 92 and the metal plate 75 and securing them through screwing.

Moreover, since the entirety of the image capture unit main body 10 is covered by the resin cover 80, a reduction in the cost is achieved. In addition, the influence of static electricity on the circuit board provided within the image capture unit main body 10 can be reduced.

Figure 9:
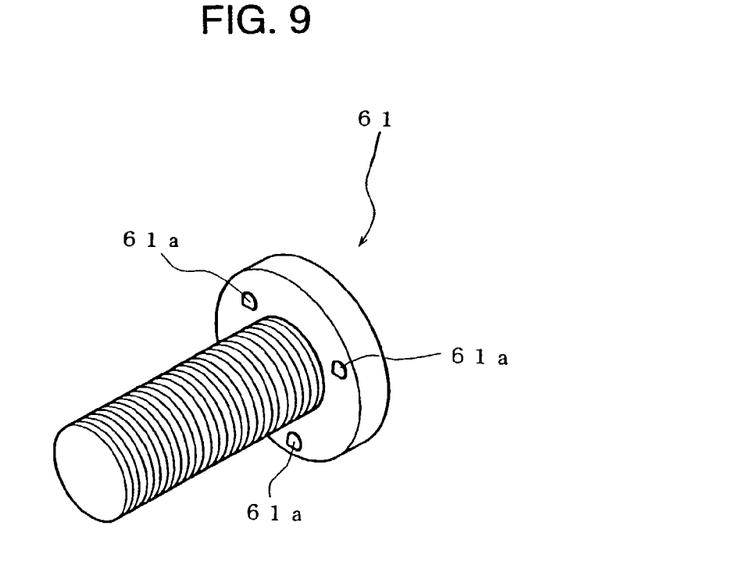
FIG. 9 is an external view of a screw 61 provided with projections.

It is to be noted that while the explanation is given on an example in reference to the embodiment described above in which the screws 60 are employed to secure the linking shaft 90 to the cover 20*c* of the display unit main body 20, the cover 20*c* of the display unit main body 20 and the linking shaft 50 can also be secured together firmly by employing screws 61 each provided with projections 61*a* at the head, as illustrated in FIG. 9, instead.

Furthermore, when the screws 61 illustrated in FIG. 9 are used, the projections 61*a*, 61*a*, . . . , provided at the heads of the screws 61 bite into the metal cover 40 when the screws 61 are tightened. Consequently, electrical conduction can be achieved between the metal cover 40 and the screws 61 with a high degree of reliability even when the surface of the metal cover 40 is coated with paint or covered with alumite.

Since the metal plate 70 provided on the inside of the resin cover 30 and the screws 61 are made to be conducted through screwing, the metal cover 40, too, can be connected to the ground with ease when tightening the screws 61, simply by connecting the metal plate 70 to the negative terminal of a battery in advance. As a result, such adverse effects as static electricity occurring outside causing the circuit operation in the display unit main body 20 to become unstable and the like can be avoided with a high degree of reliability. This variation is particularly effective when the metal cover 40 is exposed inside through a hole bored at a portion of the resin cover 30 to receive the internal parts.

Figure 10:
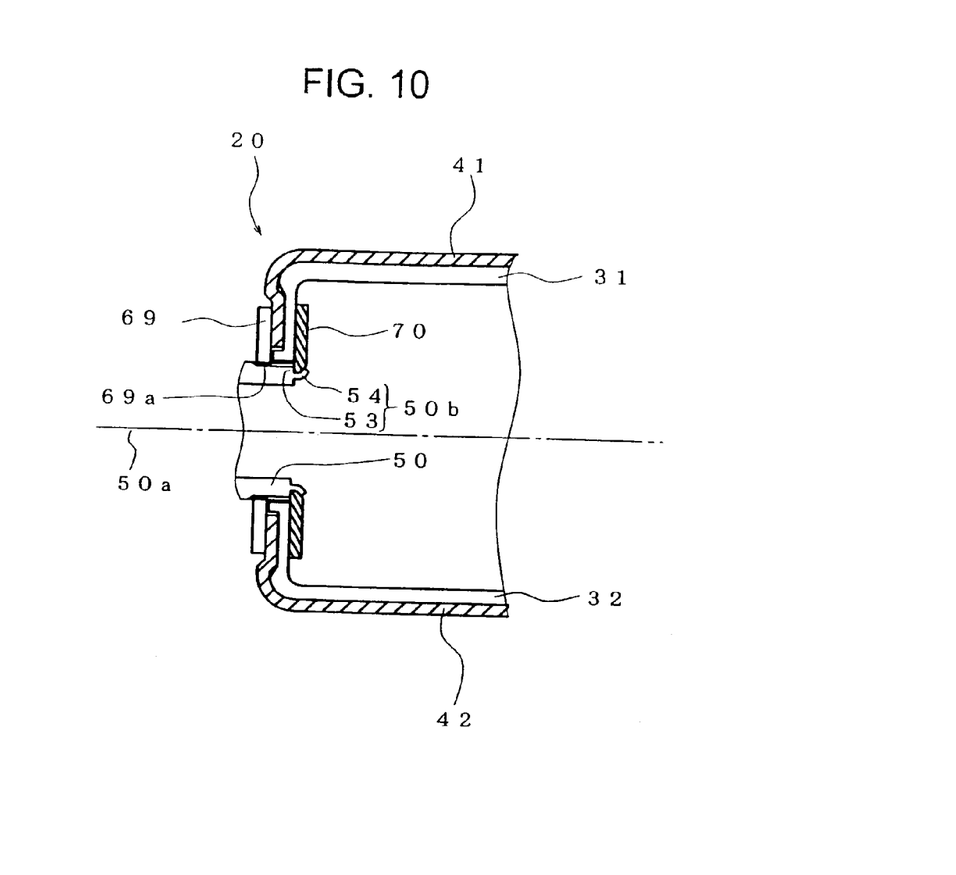
FIG. 10 illustrates an example in which the linking shaft 50 is secured to the display unit main body 20 with a nut 69.

In addition, while the explanation is given above in reference to the embodiment on an example in which the screws 60 (61) are used to secure the linking shaft 50 to the cover 20c of the display unit main body 20, the cover of the display unit main body 20 and the linking shaft 50 can be also secured together firmly by using a nut 69 as illustrated in FIG. 10 (corresponds to the cross section in FIG. 6), instead. In this case, the male threads 69a are formed at specific positions of the linking shaft 50.

Figure 11:
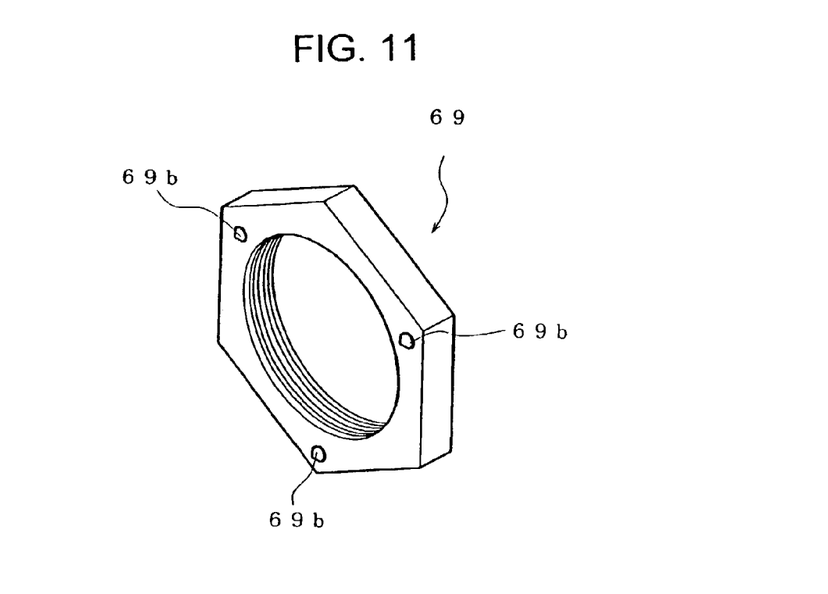
FIG. 11 is an external view of the nut 69 with projections.

Furthermore, conduction can be achieved between the metal cover 40 and the nut 69 with a high degree of reliability when the nut 69 is tightened by providing projections 69b (see FIG. 11) at the nut 69 illustrated in FIG. 10, as in the case with the screws 61 (see FIG. 9) explained earlier.

Since the nut 69 and the linking shaft 50 are made to be conducted through screwing and the linking shaft 50 and the metal plate 70 are made to be conducted through caulking, the metal cover 40, too, can be connected to the ground with ease when mounting the nut 69 simply by connecting the metal plate 70 to the negative terminal of a battery in advance. As a result, such adverse effects as static electricity occurring outside causing the circuit operation inside the display unit main body 20 to become unstable and the like can be avoided with a high degree of reliability.

Moreover, while the explanation is given above in reference to the embodiment on an example in which the metal cover 40 of the display unit main body 20 extends to the front surface and the rear surface of the display unit main body 20, the metal cover 40 may be provided only at the linking surface 20a where the linking shaft 50 is secured, instead, if it is not necessary for the metal cover 40 to assume the function of an exterior panel, to firmly secure the linking shaft 50 to the cover of the display unit main body 20.

In addition, while the explanation is given above in reference to the embodiment on the electronic camera 100 which is constituted of two units, i.e., the image capture unit main body 10 and the display unit main body 20, the present invention may be adopted in an electronic camera constituted of, for instance, three units, i.e., an image capture unit main body, a display unit main body and an electronic flash unit.

Furthermore, while the explanation is given above in reference to the embodiment on an example in which the linking shaft 50 is secured to the metal plate 70 inside the resin cover 30 and on an example in which the linking shaft 50 is mounted rotatably at the metal plate 75 within the resin cover 80, the present invention may be instead adopted in a structure in which the linking shaft is detachably mounted at the metal plate inside the resin cover or the linking shaft is mounted to allow three-dimensional displacement.

Moreover, while the metal covers 40 and 90 are constituted of an aluminum alloy in the embodiment described above, iron, magnesium or the like may be employed instead to constitute them.

In addition, while the explanation is given above in reference to the embodiment on an example in which the resin cover 30 is clamped and secured with the metal cover 40 and the metal plate 70 by using the screws 60, no restrictions are imposed in regard to the retaining members and they may be constituted of, for instance, rivets or the like. In other words, any type of retaining members can be used as long as the resin cover 30 is clamped between the metal cover 40 and the metal plate 70 to secure it firmly.

What is claimed is:

1. An electronic camera comprising:
a body unit entirely covered by a resin cover member;
a supporting member provided inside said cover member;
a unit linking member for linking with another unit, one end of which is inserted inside said cover member through an opening formed at said cover member, said one end being supported by said supporting member inside said cover member;
a metal reinforcement member provided along an outside portion of said cover member; and
a retaining member that secures together said supporting member provided inside said cover member and said reinforcement member provided along an outside portion of said cover member with said cover member clamped between said supporting member and said reinforcement member.

2. An electronic camera according to claim 1, wherein:
said cover member is formed in a roughly rectangular parallelepiped shape; and
said reinforcement member includes a first reinforcement member extending from a linking surface of said cover member provided with the opening to a first side surface perpendicular to said linking surface along an outside portion of said cover member and a second reinforcement member extending from said linking surface to a second side surface facing opposite said first side surface along an outside portion of said cover member.

3. An electronic camera according to claim 2, wherein:
said retaining member includes a plurality of screws;
said supporting member includes a metal plate at which female threaded holes for said plurality of screws are formed;
said cover member has a first cover member that includes most of said linking surface and said first side surface, and a second cover member that includes said second side surface;
through holes for said plurality of screws at said cover member are all formed at a part of said linking surface which belongs to said first cover member; and
through holes for said plurality of screws at said reinforcement member are formed both at said first reinforcement member and said second reinforcement member that come in contact with said linking surface.

4. An electronic camera according to claim 3, wherein:
said plurality of screws are each provided with projections on a side that comes in contact with said reinforcement member at a head of said screw.

5. An electronic camera comprising:
a first body unit entirely covered by a resin cover member;
a second body unit entirely covered by a resin cover member;
a unit linking member used for linking said first body unit and said second body unit;
a first supporting member provided inside said cover member of said first body unit;
a second supporting member provided inside said cover member of said second body unit;
a metal first reinforcement member provided outside said cover member of said first body unit;
a metal second reinforcement member provided outside said cover member of said second body unit;
a first retaining member that secures together said first supporting member provided inside said cover member of said first body unit and said first reinforcement member provided outside said cover member of said first body unit, with said cover member of said first body unit clamped between said first supporting member and said first reinforcement member; and a second retaining member that secures together said second supporting member provided inside said cover member of said second body unit and said second reinforcement member provided outside said cover member of said second body unit, with said cover member of said second body unit clamped between said second supporting member and said second reinforcement member, wherein:

one end of said unit linking member is inserted inside said cover member of said first body unit through an opening formed at said cover member of said first body unit to be supported by said first supporting member inside said cover member of said first body unit;

another end of said unit linking member is inserted inside said cover member of said second body unit through an opening formed at said cover member of said second body unit to be supported by said second supporting member inside said cover member of said second body unit; and at least either end of said unit linking member is supported rotatably.

6. An electronic camera according to claim 5, wherein:

said first body unit includes an image capture device for capturing an image of a subject; and said second body unit includes a display device for displaying an image captured by said image capture device.

* * * * *